Nov. 11, 1947.     R. N. WRIGHT     2,430,656
ADJUSTABLE SEAT, PARTICULARLY FOR MOTOR VEHICLES
Filed Aug. 25, 1944

Inventor
Richard N. Wright
by Mawhinney & Mawhinney
Attorneys

Patented Nov. 11, 1947

2,430,656

UNITED STATES PATENT OFFICE 2,430,656

ADJUSTABLE SEAT, PARTICULARLY FOR MOTOR VEHICLES

Richard N. Wright, Blackpool, England

Application August 25, 1944, Serial No. 551,187
In Great Britain December 16, 1943

7 Claims. (Cl. 155—14)

My main object is to provide a very simple and inexpensive form of adjustable seat—i. e., one which can be tilted and also adjusted in a fore-and-aft direction—for motor-vehicles, aircraft, motor-boats or the like.

I am aware that seats are known which are slidable in a substantially horizontal direction and of which the front and rear edges are independently adjustable in a substantially vertical direction but such prior proposals as are known to me in my opinion are relatively complicated compared with the present invention.

According to the invention, a mechanism, for supporting a seat from a stationary support, includes a pair of cross-bars at least one of which is engaged in vertical or substantially-vertical slots in a pair of brackets, means for locking the cross-bar and brackets in different adjusted positions, a framework having horizontal or substantially-horizontal slots to receive the cross-bars, and means for locking the cross-bars and framework in different adjusted positions.

According to a further feature of the invention, there is a pair of brackets having vertical or substantially-vertical slots to receive a cross-bar, the brackets and the cross-bar carrying co-acting projecting parts and depressions whereby the cross-bar, when slid axially against a return spring, is free to be raised or lowered relatively to the brackets whilst the seat is pivoting about the axis of another cross-bar, and there is a framework having slotted connections with both cross-bars, to allow of the seat being slid in a fore-and-aft direction, means being provided for locking the framework in an adjusted horizontal position. Preferably, such means includes a spring-pressed lever carried by one of the cross-bars, the lever and framework having coacting projecting parts and depressions for locking purposes. Preferably, too, I arrange the said other cross-bar so that it and the associated brackets can be raised or lowered with respect to one another in the manner of the cross-bar and brackets first mentioned, whereby the seat can be raised or lowered as a whole.

Instead of the framework being made fast on the underside of a supporting surface, for example, a floor, having slots in it through which two pairs of brackets, secured to the seat frame, extend to coact with the two cross-bars beneath the supporting surface, the framework is preferably fast with or constitutes the seat frame, the brackets being stationary uprights extending above the supporting surface.

An example of this latter arrangement is shown in the accompanying drawings, in which.

Figure 1:
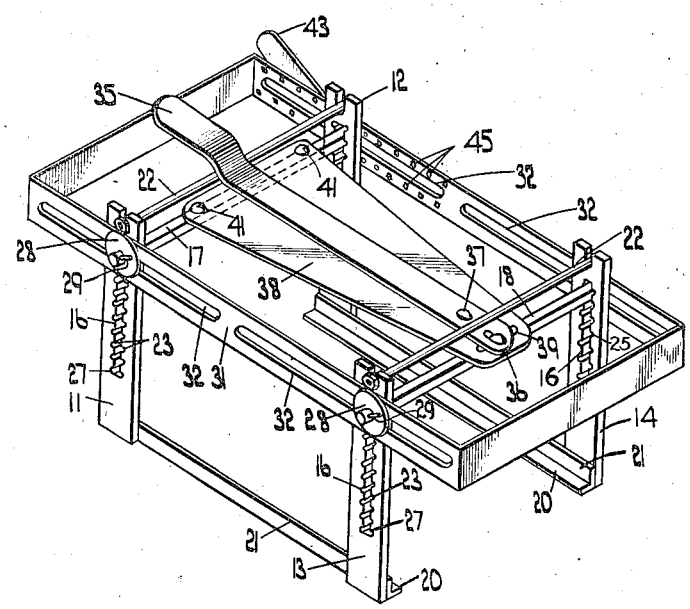
Figure 1 is a perspective view.
Figure 2:
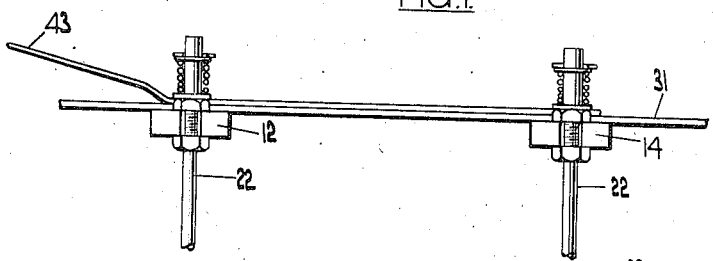
Figure 2 is a fragmentary plan of the far longitudinal side.

In the construction shown, there are two pairs of uprights (11, 12 at the front, 13, 14 at the rear) each with vertical slots 16 in them to receive the cross-bars 17, 18. These are mainly of square section, with circular ends. The two uprights on each side (11 and 13, or 12 and 14) may be formed integrally as a pressing of sheet-metal which may have, for example, a horizontal flange 20 at its lower edge, to be screwed down upon a floor-board or other base support. Alternatively, as shown, they may be independent members welded or otherwise secured to the vertical flange 21 of an angle iron. The uprights of each pair are joined to one another at their upper ends by a cross-strip 22, 22 welded or otherwise secured thereto.

The two uprights 11, 13 on the near side each have a series of cross-notches 23 leading to the slot 16, one above another, on their outer faces, which are given chamfered or flaring openings to receive cross-pins 24 fast on the cross-bars 17, 18, and the two uprights 12, 13 on the other side each have corresponding notches 25 on their inner faces to receive other cross-pins 24 on the cross-bars. These notches 23, 25 do not extend right through the uprights, as will be apparent from Figure 4; but the lower ends of the slots are provided with enlarged or through openings 27 through which the cross-bars (with their cross-pins 24) can be inserted from one side, the bars being held in position in the uprights in any convenient manner, as by means of washers 28 and split pins 29 through their ends.

Obviously, the coacting projecting parts and depressions may take other forms than that illustrated.

The framework 31—for example, a rectangular ring in plan view—which constitutes the seat frame in this example, passes outside the four uprights and has longitudinal slots 32 in opposite sides through which the ends of the cross-bars 17, 18 extend with comparative freedom. Coil compression springs 33 are mounted on the cross-bars to bias them axially in the engaging direction. The seat itself, to be secured to the seat frame, is not shown in the drawings. It will extend upwardly over the uprights.

Thus, when either of the cross-bars 17, 18 is moved axially against the associated return spring 33 to release the lock, i. e., to withdraw both cross-pins 24 from their cross-notches, it can then be raised or lowered whilst the seat frame is pivoting about the axis of the other cross-bar and whilst one of the cross-bars moves as necessary along the slots 32 in the seat frame; or both cross-bars could be released at the same time and the seat raised or lowered as a whole.

Obviously, the cross-bars may be operated by pressure applied to the appropriate ends, or I may make use of a single central lever 35 directly pivoted upon one cross-bar and having a pin-and-slot connection with the other. Actually, another alternative is shown, the lever 35 having a slotted connection with the pivot 36 upon the cross-bar 18 and being pivoted at 37 upon a plate 38 which is fast with the cross-bar 17 and slotted at 39 to receive the pivot 36. Applying force in one direction to this lever will move the cross-bar 17 in the releasing direction whilst the lever fulcrums about its pivotal connection 36 with the other cross-bar, and applying a force in the other direction to the lever will reverse that process— i. e., move the cross-bar 18 in the releasing direction whilst the lever turns about the pivot 37.

The pivot 36 and the attachment of the plate 38 to the cross-bar 17 may be by means of washers and split pins passed through projections carried by the cross-bars, or, as shown, by bolts 36, 41. In consequence, in order to dismantle the parts it is only necessary to remove these two split pins or the bolts and the lever and plate 38, and to remove the split pins 29 from the appropriate ends of the cross-bars, when the latter can be withdrawn axially, thereby releasing the seat frame.

Figures 3, 4:
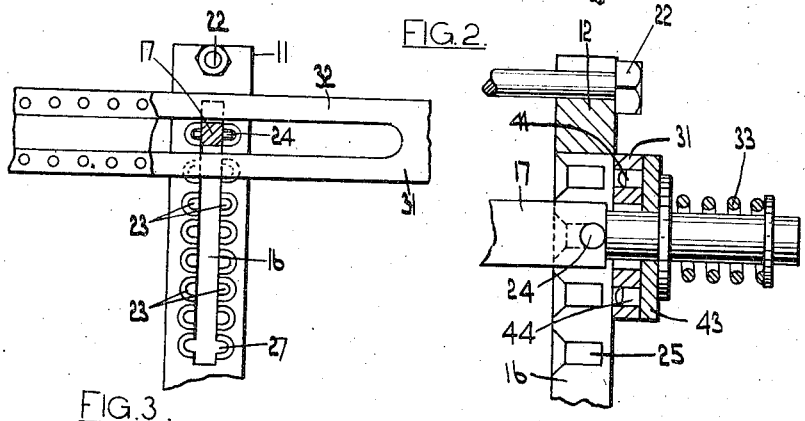
Figure 3 is a fragmentary elevation, to a slightly larger scale and partly in section, of the far forward upright and adjacent parts.
Figure 4 is a fragmentary cross-section, to a still larger scale, through the far front upright.

On one side of and beside the seat frame is arranged a lever 43 with a clearance hole to receive the cross-bar 18 and a longitudinal slot where the cross-bar 17 extends through it. It is pressed towards the seat frame by the springs 33 on the bars. It can, therefore, be rocked laterally—i. e., in the plane of the two bars 17, 18—while fulcruming about its end adjacent the bar 18. It is provided with a projection 44 (for example, in the vicinity of the bar 17, as shown by Figure 4) directed towards a series of horizontal depressions or through holes 45 provided in the adjacent face of the seat frame. When the lever is pulled away from the seat frame against the pressure of one (or both) of the coil springs 33, the projection 44 is removed from whatever hole 45 was engaged by it, and the seat frame is thereby released and can then be slid in a fore-and-aft direction.

What I claim as my invention and desire to secure by Letters Patent of the United States is:

1. A seat supporting mechanism comprising front and rear pairs of stationary brackets each bracket being provided with a vertical slot therein, a pair of axially slidable cross-bars, each cross-bar being respectively engaged in the slots of a pair of brackets, coacting lock elements on said brackets and on said cross-bars respectively for locking said cross-bars at a desired adjusted height in said slots, said lock elements being disengageable by axially sliding said cross-bars, a seat supporting framework having horizontally slotted side frame members, said cross-bars being received in the slots of said side frame members so that said framework is longitudinally slidable on said cross-bars, and means for holding said framework in a longitudinally adjusted position.

2. A seat supporting mechanism, according to claim 1, including resilient means which tends normally to bias the cross-bars axially into the position in which the coacting lock elements thereon and on the said brackets are engaged.

3. A seat supporting mechanism, according to claim 1, including spring means which tends normally to bias the cross-bars axially into the position in which the coacting lock elements thereon and on the said brackets are engaged, and lever operated means for effecting an axial sliding movement of said cross-members against the opposition of said spring means for effecting the disengagement of the coacting locking elements for the purpose of permitting a height adjustment to be effected.

4. A seat supporting mechanism comprising front and rear pairs of stationary brackets each bracket being provided with a vertical slot therein, a plurality of oppositely disposed horizontal recesses in the presented walls at one side of said slots, a pair of axially slidable cross-bars, each cross-bar respectively engaging one pair of slots, projections carried by each cross-bar adapted, by the axial sliding of the said cross-bar to be engaged with and disengaged from selected said recesses for locking and unlocking the said cross-bar with respect to its respective pair of brackets and thus enable the height of the said cross-bar to be adjusted, spring means acting axially on the cross-bars to urge the said projections into locking engagement with the said recesses, means for effecting an axial sliding movement of the cross-bars against the opposition of the said spring means for producing a disengagement of the projections from the recesses when it is desired to make an adjustment of height, a seat supporting framework having horizontally slotted side frame members, said cross-bars being received in the slots of said side frame members so that said framework is longitudinally slidable on said cross-bars, and means for holding said framework in a longitudinally adjusted position.

5. A seat supporting mechanism, according to claim 4, in which the lowermost recess in each side of the slot in each bracket is prolonged to form a through-hole through which, when the cross-bars are at their lowest height of adjustment, the projections on said cross-bars can be drawn when it is desired to dismantle the mechanism.

6. A seat supporting mechanism, according to claim 4, in which the spring means are in the form of coil springs arranged around one end of each cross-bar.

7. A seat supporting mechanism, according to claim 4, in which the mouths of the recesses are flared for facilitating their engagement by the projections.

RICHARD N. WRIGHT.

REFERENCES CITED

The following references are of record in the file of this patent:

UNITED STATES PATENTS

| Number | Name | Date |
|---|---|---|
| 822,701 | Sutton | June 5, 1906 |
| 1,355,404 | McKee | Oct. 12, 1920 |
| 1,688,316 | Deveau | Oct. 16, 1928 |
| 1,957,785 | Knapp | May 8, 1934 |
| 2,057,591 | Rast | Oct. 13, 1936 |
| 2,235,237 | Saunders et al. | Mar. 18, 1941 |
| 2,298,351 | DeRose | Oct. 13, 1942 |

FOREIGN PATENTS

| Number | Country | Date |
|---|---|---|
| 40,439 | Denmark | July 8, 1929 |